March 6, 1956 R. F. WEHRLIN ET AL 2,737,579

AMPLIFIER ASSEMBLY

Filed April 6, 1951 2 Sheets-Sheet 1

INVENTORS
RICHARD F. WEHRLIN
JOHN LEEBL
BY
Henry L. Shenier
ATTORNEY

March 6, 1956 R. F. WEHRLIN ET AL 2,737,579
AMPLIFIER ASSEMBLY
Filed April 6, 1951 2 Sheets-Sheet 2

INVENTORS
RICHARD F. WEHRLIN
JOHN LEEBL
BY Henry L. Shenier
ATTORNEY

United States Patent Office 2,737,579
Patented Mar. 6, 1956

2,737,579

AMPLIFIER ASSEMBLY

Richard F. Wehrlin, New York, N. Y., and John Leebl, Passaic, N. J., assignors, by mesne assignments, to ACF Industries, Incorporated, a corporation of New Jersey Application April 6, 1951, Serial No. 219,548

7 Claims. (Cl. 250—16)

Our invention relates to amplifier assemblies and more particularly to a compact assembly involving a plurality of thermionic tubes occuping the minimum space for maximum power and of greatly reduced size and weight.

Electronic assemblies, such as amplifiers, have many uses in the art. Many devices employ a large number of amplifiers. An electrical computer, for example, may employ as many as fifteen amplifiers. When used in fire conrol apparatus, bombing computers and the like, the maintenance of the amplifiers becomes a problem. Furthermore, the assembly with amplifiers of the prior art involves a large space which is at a premium in an aircraft, for example.

One object of our invention is to provide an amplifier assembly of greatly reduced size and weight.

Another object of our invention is to provide an amplifier assembly which is quickly and easily replaceable.

Another object of our invention is to provide an amplifier assembly easy to install, occupying a minimum of space which, nevertheless, gives maximum power.

Another object of our invention is to provide an amplifier assembly in which the heat of the thermionic tubes is conducted away, enabling the assembly to be made in a minimum of space.

Other and further objects of our invention will appear from the following description.

In general our invention contemplates the provision of any desired amplifier circuit so constructed and arranged that all of the thermionic tubes are physically located in a group removed from the other components of the circuit such as the resistors, capacitors and inductors. A heat conducting member made of metal or the like having a good heat conductivity is provided with a plurality of recesses in which the tubes are adapted to be lodged. Means are provided for bringing the tubes into contact with the heat conducting metal surfaces. Other electrical components of the circuit are assembled in proximity to each other and potted to lend physical support to the components to protect them and to insulate them not only electrically, but from heat and moisture. The entire assembly is housed by a protective metal covering adapted to make good contact with the heat conducting metal block in which the thermionic tubes are positioned. The circuit terminates in a plurality of prongs adapted to be inserted in a readily detachable manner in a terminal block so that the amplifier may be removed as a unit and readily and rapidly replaced.

In the accompanying drawings which form part of the instant specification and which are to be read in conjunction therewith and in which like reference numerals are used to indicate like parts in the various views.

Figures 1, 2:
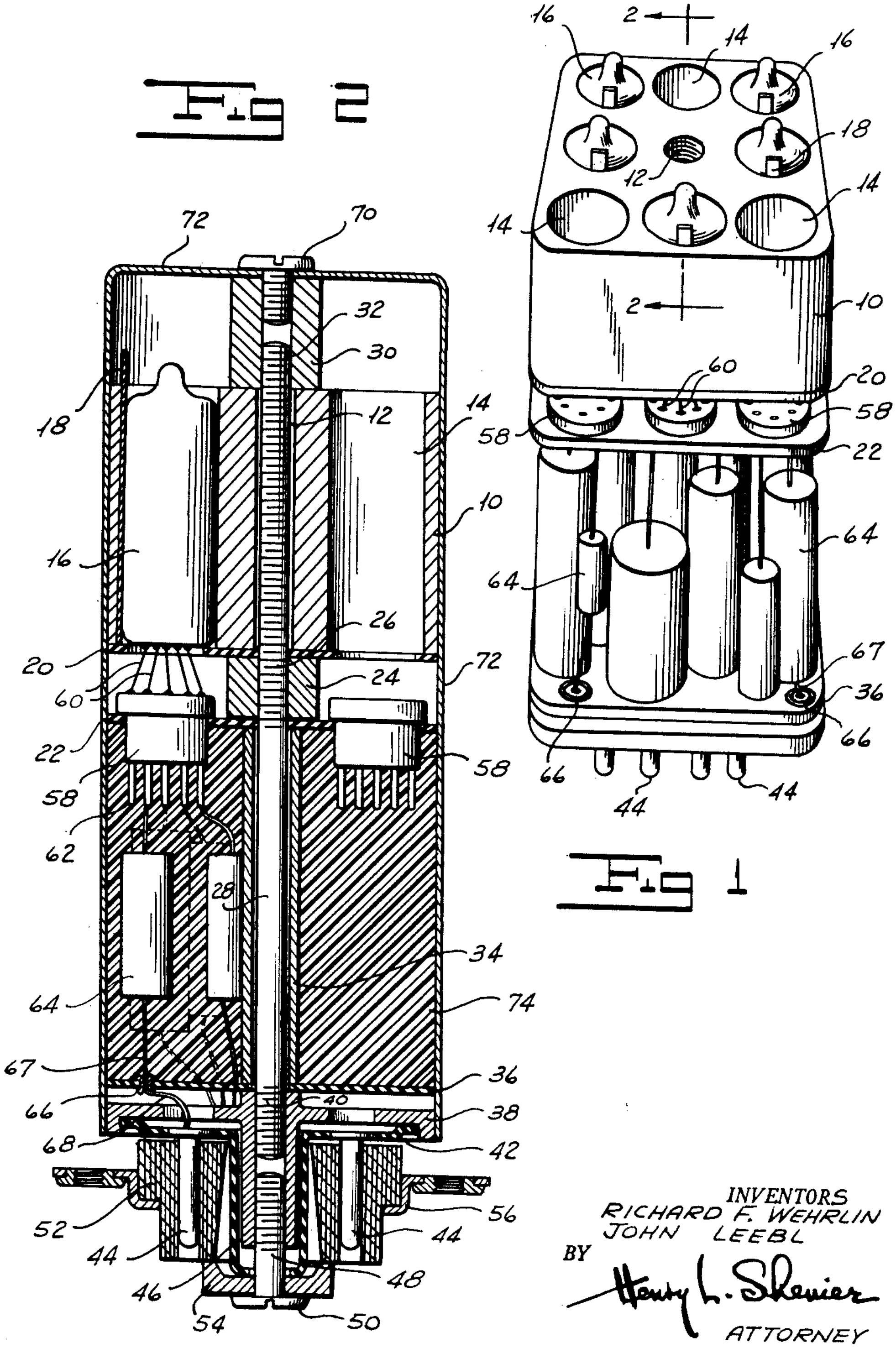
Figure 1 is a perspective view of an amplifier assembly of our invention removed from the casing and before potting.
Figure 2 is a sectional view taken along the plane 2—2 of Figure 1 with the potting compound and casing in position shown in assembled relation upon an instrument panel.

More particularly, referring now to the drawings, our assembly comprises a metal heat conducting block 10 formed of aluminum, copper or other similar material. The block may be formed in any desired manner, as by casting, to provide a central opening 12 and a plurality of tube receiving openings 14. If desired, a solid block of metal may be bored to provide the tube receiving openings 14 and the central opening 12. The openings 14 may be of any desired size to receive miniature thermionic tubes, though it is to be understood, of course, that our invention is applicable to tubes of any size. Actually the size of the openings 14 is sufficiently large to house thermionic tubes 16 of a variety of diameters. The diameter of the tube housing openings 14 is larger than the diameter of the largest thermionic tube to be used in the assembly and since the openings are open ended air may circulate through the opening as in a chimney. In order to ensure contact between the side of the tube and the heat conducting block 10 we insert strips 18 adapted to press the tube into contact with the metal surface. The thickness of the metal strips 18 will depend, of course, on the difference in diameter of the tubes 16 and the diameter of the tube receiving openings 14. A transverse partition 20 made out of fiberglass impregnated with a suitable plastic or of a panel of Bakelite or the like supports the block 10. A similar panel 22 is spaced below the panel 20 by means of a nut 24 which may be made of metal. The spacer nut 24 is internally threaded and adapted to receive the threaded portion 26 of a central rod 28 which extends longitudinally of the axis of our assembly. An upper nut 30 is adapted to receive the threaded end portion 32 of the rod 28. By tightening the nut 30 the heat exchange block 10 and the panel 20 are adapted to be clamped between the nuts 24 and 30. A bushing 34 spaces an insulating panel 36 from the panel 22. A cover plate such as the dish 38 is provided with an internally threaded portion adapted to engage the lower threaded end 40 of the rod 28. In this manner the dish or plate 38 clamps the panel 36 and the panel 22 to the ends of the bushing 34 between itself and the nut 24. The space between the panels 22 and 36 forms an area in which the circuit components, such as the resistors, capacitors and the like are adapted to be positioned. An insulating base member 42 is adapted to be seated upon dish or plate 38 and to carry the terminal prongs 44 of the assembly. Dish or plate 38 is provided with a central extension 46 which is internally threaded and adapted to receive the threaded end 48 of an assembly screw 50. The prongs 44 seat in a member 52 provided with openings for the reception of the prongs. The member 52 is clamped to the dish 38 by means of the screw 50 acting through a cup member 54. The socket member 52 may carry a member 56 secured thereto in any suitable manner and carried by the instrument panel of any assembly in which the amplifiers are to be used.

The panel 22 carries a plurality of terminal blocks 58 to which the elements of the thermionic tube 16 are connected by conductors 60 which are relieved of strain due to the fixed spacing of panels 20 and 22. Each terminal block carries prongs 62 by which the tube elements are in turn connected to the electrical impedance elements, such as resistors, capacitors or the like, 64. The panel 36 may be fitted for a plurality of ferrules 66 to which the conductors 67 from the circuit components 64 are soldered. The conductors 68 connecting the circuit to the prongs 44 of the base of our assembly are connected to the ferrules 66. It is to be understood that any suitable means for making these connections may be employed, and these are given merely as illustrative.

It will be noted that the heat conducting block 10 is provided with a plurality of tube receiving openings 14. As shown in Figure 1 of the assembly, five thermionic tubes 16 are employed in the circuit, leaving three of the eight openings vacant. One form of block may be used for a plurality of circuits and the unoccupied tube openings merely create a greater area for heat radiation.

Referring again to Figure 2, the upper nut 30 is adapted to receive a machine screw 70 to hold a protective casing 72 to the assembly. The casing 72 contacts the sides of the heat exchange block 10 so that the heat generated by the filaments of the thermionic tubes 16 will be dissipated over a greater area, thus serving to keep the operating temperature at a low point and preventing overheating of the tubes and the assembly. The components 64 which have been soldered in place between the panels 22 and 36 to their connecting conductors of the circuit are potted by a potting compound 74. This potting compound may be any suitable dielectric resin, such as thermoplastic polystyrene resins, vinyl and polyvinyl resins. We prefer to use thermosetting resins such as allyl resin, melamine-formaldehyde resin, or the like. These dielectric solid resinous materials will be referred to as "potting compounds." In using the thermosetting resins after the components have been soldered in the circuit between the panels 22 and 36, a mold is placed around the components. The mold is then filled with the thermosetting plastic material and baked at the desired temperature for a desired period of time to set the resinous material into a solid block. The mold is then removed and the protective metal casing such as the housing 72 may then be secured to the assembly.

Figure 3:
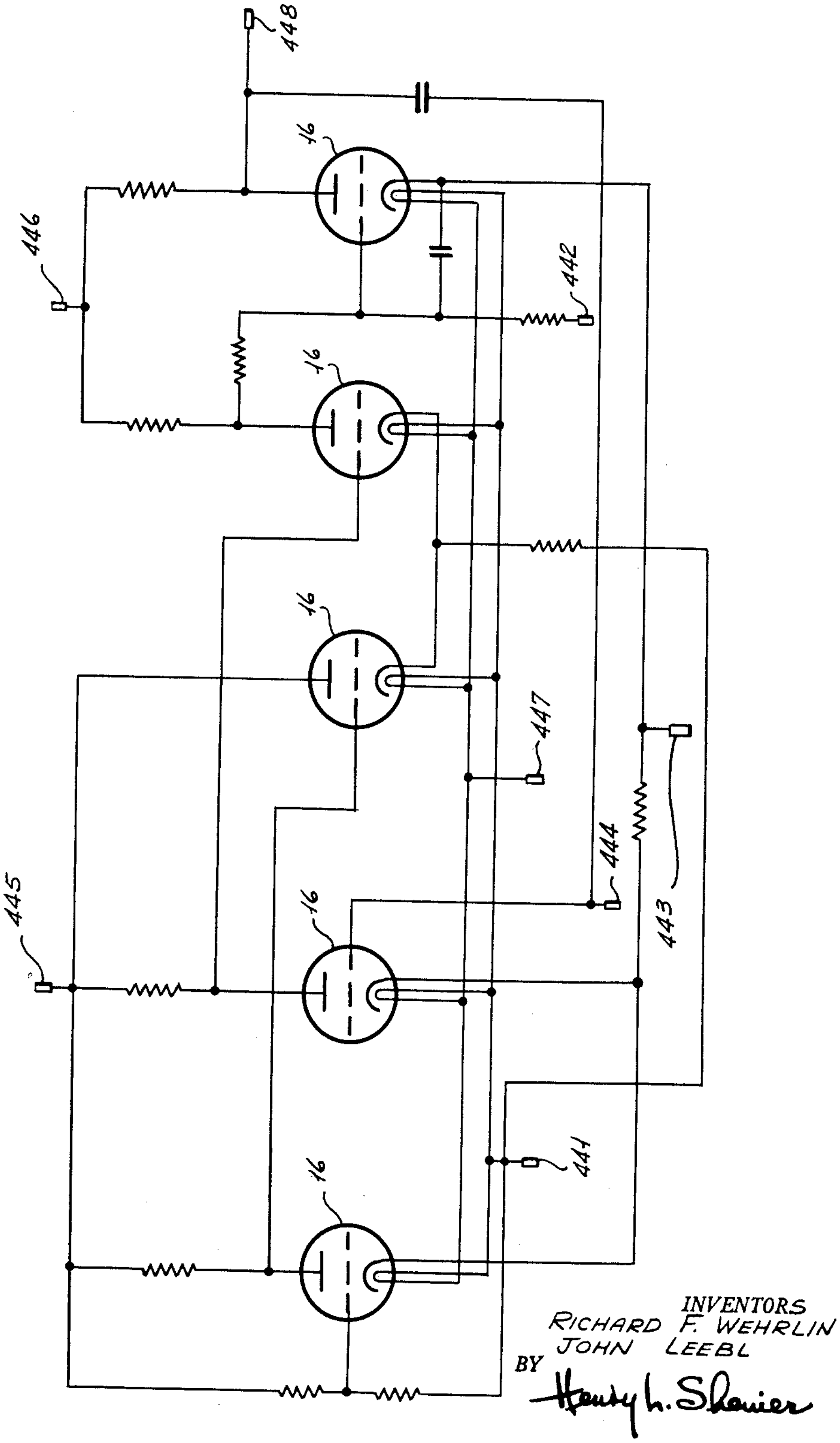
Figure 3 is a diagrammatic view showing a typical amplifier circuit adapted to be used in carrying out our invention.

Referring now to Figure 3 showing a typical circuit, it will be observed there are five thermionic tubes 16 corresponding to the five tubes shown in Figure 1. The various resistors and capacitors shown in the circuit correspond to the components 64 shown in Figures 1 and 2. It is these components which are connected in the circuit between the panels 22 and 36 and potted. There are eight terminal prongs corresponding to the eight prongs 44 shown in Figures 1 and 2. Prong 441 is adapted to be connected to ground. Prong 442 is adapted to be connected to the —300 volt terminal. Prong 443 is adapted to be connected to the —150 volt terminal. Prong 444 is adapted to be connected to the input of the amplifier. Prong 445 is adapted to be connected to the +150 volt terminal. Prong 446 is adapted to be connected to the +300 volt terminal. Prong 447 is adapted to be connected to the filament battery positive terminal, the other side of which is connected to ground 441. The output of the amplifier is connected to prong 448.

It is to be understood that the amplifier circuit is merely illustrative and that any other desired circuit may be employed without departing from the spirit of our invention.

A typical circuit such as is shown in Figure 3, using miniature tubes and provided with a heat conducting block as shown in our invention, had a weight of only twelve ounces in operating condition. The amplifier assembly can be quickly replaced by pulling the base out of the socket after removing screw 50 in event one of the amplifier assemblies in the multi-amplifier arrangement becomes defective or inoperative for some reason. The heat conducting block and its contact with the casing 72 ensures that the heat generated by the filaments of the thermionic tubes is efficiently and rapidly conducted away and transferred to the circumambient atmosphere. The amplifier assembly is quite compact and protected against humidity so that it will operate efficiently under varying conditions and altitude and temperature as may be encountered in tropical or arctic conditions. The potting provides mechanical support for the components and the heat conducting block, together with the metal strips 18, supports the tubes, protecting the assembly against injury from vibration as may be encountered in aircraft.

It will be seen that we have accomplished the objects of our invention. We have provided an amplifier assembly of very small size and weight, which assembly is quickly and easily replaceable. We have provided an amplifier assembly which is easy to install, but which nevertheless gives maximum power for the small space it occupies. We have provided an amplifier assembly in which the heat of the thermionic tubes is conducted away, thus enabling our amplifier to operate in small spaces at high efficiency for long periods of time.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. In an assembly of the character described, a rod, a block of heat conducting metal formed with a plurality of bores and a central bore, said rod extending through said central bore, means for securing the metal block to the rod, thermionic tubes positioned within the bores, a block of solid dielectric material formed with an axial bore, said dielectric block being positioned about said rod, means for securing the dielectric block to said rod, electrical impedance units imbedded in the solid dielectric material, circuit means connecting the electrical impedance units and the thermionic tubes in an electronic circuit, a heat conducting metallic housing in contact with the metal block and adapted to surround the metal block and the block of dielectric material, means for securing the housing to the rod, a cover for the housing, means for securing the cover to the rod, a base member formed with prongs adapted to form input signal, output signal and voltage connections to the electronic circuit, means for connecting the prongs to the circuit, and means for securing the base member to the rod.

2. An assembly as in claim 1 including means for engaging the thermionic tubes with the metal of the metal block to ensure heat from the thermionic tubes will be conducted by the block away from the tubes.

3. In an assembly of the character described a rod, a block of heat conducting metal formed with a plurality of bores and a central bore, said rod extending through said central bore, means for securing the metal block to the rod, thermionic tubes positioned within the bores, a block of solid dielectric material formed with an axial bore, said dielectric block being positioned about said rod, means for securing the dielectric block to said rod, electrical impedance units imbedded in the solid dielectric material, circuit means connecting the electrical impeddance units and the thermionic tubes in an electronic circuit, a heat conducting metallic housing in contact with the metal block and adapted to surround the metal block and the block of dielectric material, means for securing the housing to the rod, a base member formed with prongs adapted to form input signal, output signal and voltage connections to the electronic circuit, and means for connecting the prongs to the circuit.

4. In an assembly of the character described, an elongated supporting member, a block of heat conducting metal formed with a plurality of bores, one of which receives said supporting member, means securing the metal block to the supporting member, thermionic tubes of less diameter than certain of said bores positioned in said bores, resilient metallic means located within certain of said bores and in contact with the tubes and block to force the tubes into heat conducting contact with the metal of the block and to conduct heat from the tubes to the block, spaced panels, a block of solid dielectric material held between the spaced panels, means for securing the dielectric material and spaced panels to said supporting member and in spaced relation to said metal block, electrical impedance units imbedded in the solid dielectric material, circuit means connecting the electrical impedance units and the thermionic tubes in an electronic circuit, a base member formed with prongs adapted to form input, output, and voltage connections to the electronic circuit, means connecting the prongs to the circuit, and means securing the base member to the supporting member.

5. In an assembly of the character described, an elongated supporting member, a block of heat conducting metal formed with a plurality of bores, one of which receives said supporting member, means securing the metal block to the supporting member, thermionic tubes of less diameter than certain of said bores positioned in said bores, resilient metallic means located within certain of said bores and in contact with the tubes and block to force the tubes into heat conducting contact with the metal of the block and to conduct heat from the tubes to the block, a bushing, panels held spaced by said bushing, a block of solid dielectric material surrounding the bushing and held between the spaced panels, said supporting member passing through said bushing and carrying means securing the dielectric material and spaced panels to the supporting member and in spaced relation to said metal block, electric impedance units imbedded in the solid dielectric material, circuit means connecting the electric impedance units and the thermionic tubes in an electronic circuit, a base member formed with prongs adapted to form input, output, and voltage connections to the electronic circuit, means connecting the prongs to the circuit, and means securing the base member to the supporting member.

6. In an assembly of the character described, a rod, a block of heat conducting metal formed with a plurality of bores and a central bore, said rod extending through said central bore, means for securing the metal block to the rod, thermionic tubes positioned within the bores, a block of solid dielectric material formed with an axial bore, said dielectric block being positioned about said rod, means for securing the dielectric block to said rod, electrical impedance units imbedded in the solid dielectric material, circuit means connecting the electrical impedance units and the thermionic tubes in an electronic circuit, a heat conducting metallic housing in contact with the metal block and adapted to surround the metal block and the block of dielectric material, means for securing the housing to the rod, and a base member having conducting means for forming input signal, output signal and voltage connections to the electronic circuit.

7. In an assembly of the character described, a block of heat conducting material formed with a plurality of bores therethrough, thermionic tubes positioned within the bores in contact with the walls thereof, a block of solid dielectric material in spaced relationship to said block of heat conducting material, said block of solid dielectric having electrical impedance elements imbedded therein, circuit means connecting the electrical impedance elements and the thermionic tubes in an electronic circuit, a heat conducting metallic housing enclosing the blocks, fastening means for securing the blocks in the housing with sides of the metal block in contact therewith, and a base member attached to the housing by said fastening means and having conducting means for forming input signal, output signal and voltage connections to the electronic circuit.

References Cited in the file of this patent

UNITED STATES PATENTS

| | | |
|---|---|---|
| 2,468,727 | Bauman | May 3, 1949 |
| 2,499,589 | Kennedy | Mar. 7, 1950 |
| 2,539,146 | Loewy | Jan. 23, 1951 |
| 2,590,821 | Kiser | Mar. 25, 1952 |
| 2,614,243 | Clark | Oct. 14, 1952 |
| 2,637,763 | Palmer | May 5, 1953 |
| 2,651,007 | Shepard et al. | Sept. 1, 1953 |

FOREIGN PATENTS

| | | |
|---|---|---|
| 671,156 | France | Dec. 10, 1929 |
| 144,122 | Switzerland | Dec. 15, 1930 |